United States Patent Office.

ELLIOT SAVAGE, OF WEST MERIDEN, CONNECTICUT.

Letters Patent No. 86,944, dated February 16, 1869; antedated January 30, 1869.

IMPROVED PROCESS OF TREATING IRON AND STEEL.

The Schedule referred to in these Letters Patent and making part of the same.

*To all whom it may concern:*

Be it known that I, ELLIOT SAVAGE, of West Meriden, in the county of New Haven, and State of Connecticut, have invented a new and useful Method or Process of Treating Metals, for the purpose of separating from them various impurities or foreign substances that are highly detrimental if not destructive to such metals; and I do hereby declare the following to be a full, clear, and exact description of the same.

The method or process is specially adaptable to the treatment of iron and steel, for the purpose of removing from them phosphorus, sulphur, and silicon.

No successful method has heretofore been essayed by which the above-mentioned impurities, especially phosphorus and sulphur, can be separated from and taken out of these metals, except by tedious, expensive, and destructive analysis of the same, or by decomposing them by electricity, which destroys them for all purposes, except for scientific experiments.

It is well known that the presence of phosphorus in iron and steel, so impairs the cohesive power of the metals as to almost destroy their strength, and rendering them so brittle that a small force, applied to a bar of metal of this description, will break or fracture it when cold, although it might possess a good degree of strength while heated to a red heat. Therefore, iron or steel containing any considerable quantity of phosphorus, is found to be so brittle as to be almost worthless, and is technically called "cold-short."

The reverse of the above takes place when sulphur is present in iron or steel. Then the cohesive power of the metal, when heated to redness, is so impaired that, when a small force is applied to it, it falls to pieces, and, in some cases, this occurs even by its own weight, although it may possess a good degree of strength when cold.

It is evident that the great usefulness of iron and steel arises from their susceptibility of being forged and wrought into various shapes, sizes, and forms, while heated to a high degree. Consequently, when any considerable quantity of sulphur exists in iron or steel, it renders it comparatively useless.

The effect of the presence of sulphur in iron or steel, when the same is heated, is to cause it to fly into fragments when hammered. This condition is technically called "red-short."

My method of treating metals, for the purpose of purifying and refining them, is specially applicable to what is known as the "Bessemer metal," and is as follows:

I first construct a suitable furnace, with a proper vessel set therein, in which to heat and fuse the material used for this purpose, which is the cyanide of potassium, or other fusible compound, containing cyanogen, combined with one or more metals, together with one or more of the compounds of sodium or potassium, as the chloride of sodium, the carbonate of soda, the bicarbonate of soda, and the biborate of soda, or the carbonate of potassa, or the chloride of potassium.

I prefer to use the cyanide of potassium with the chloride of sodium, say about ninety (90) parts of the former, and about ten (10) parts of the latter, but I do not wish to confine myself to these definite quantities of the substances mentioned, as they may be varied.

Into the above-mentioned vessel I put this mixture, and then apply sufficient heat to the vessel to fuse the material therein, and bring it to a red heat. I then take the metal to be treated, and submerge it in the liquid, and allow it to remain a sufficient period of time to thoroughly permeate the metal, which is usually accomplished in three or four hours. I then remove the metal from the vessel, and dissolve off what adheres to it of the composition in a vessel of water.

I find, upon heating and working this metal in the ordinary way, that it has not the character of "cold-short," or of "red-short," and showing that every trace of phosphorus and sulphur has been extracted, and the metal is not only purified and refined to a high degree, but is transformed into steel of the most superior quality.

The foregoing description of the treatment of "Bessemer metal," applies also to the treatment of iron for the purpose of purifying it.

Iron thus treated, is not only purified from phosphorus, sulphur, and silicon, but it takes up from the bath in which it is heated, a small amount of carbon, and is especially adapted to be made into cast-steel by the ordinary process of melting it in crucibles or pots.

Steel thus made, either from iron or the "Bessemer metal," is found to be uninjured by such a degree of heat as is required to weld it to iron, as, for instance, in the case of plating steel upon railroad-bars.

Having thus fully described my invention,

What I claim therein as new, and desire to secure by Letters Patent, is—

The treatment and purification of iron and steel in a heated bath of cyanide of potassium and a compound of soda, substantially as and for the purpose herein described.

ELLIOT SAVAGE.

Witnesses:
A. B. STOUGHTON,
EDM. F. BROWN.